Jan. 26, 1960

B. HARRISON ET AL 2,922,237

APPARATUS FOR CONVERTING A CONVENTIONAL FOUR-WHEEL
TRACTOR INTO A TWO-WHEEL TRACTOR AND TWO-WHEEL
IMPLEMENT COMBINATION

Filed Aug. 2, 1956

INVENTORS
JOLLY K. HARRISON
BENJAMIN HARRISON

BY  *Wynn, Liddy, Nathanson & March*

ATTORNEYS

Jan. 26, 1960     B. HARRISON ET AL     2,922,237
APPARATUS FOR CONVERTING A CONVENTIONAL FOUR-WHEEL
TRACTOR INTO A TWO-WHEEL TRACTOR AND TWO-WHEEL
IMPLEMENT COMBINATION
Filed Aug. 2, 1956     3 Sheets-Sheet 2
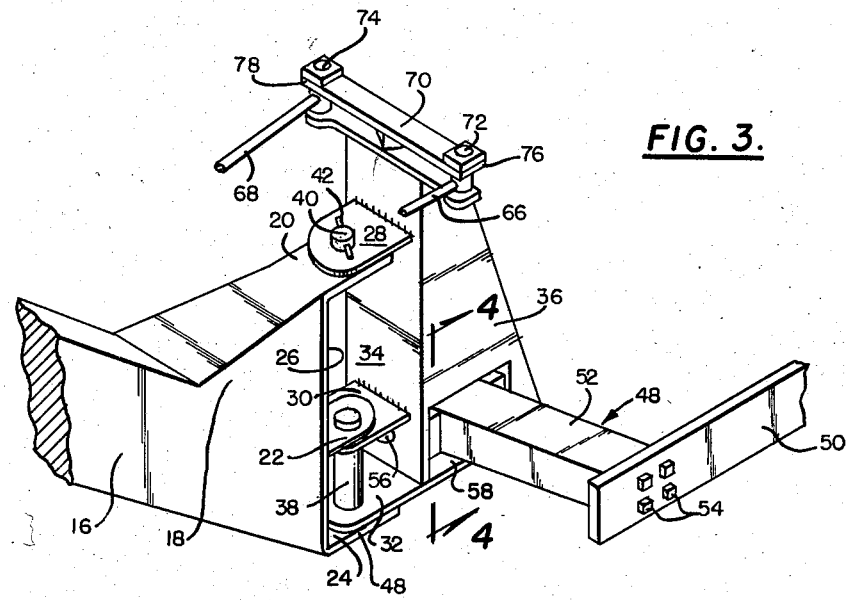
FIG. 3.
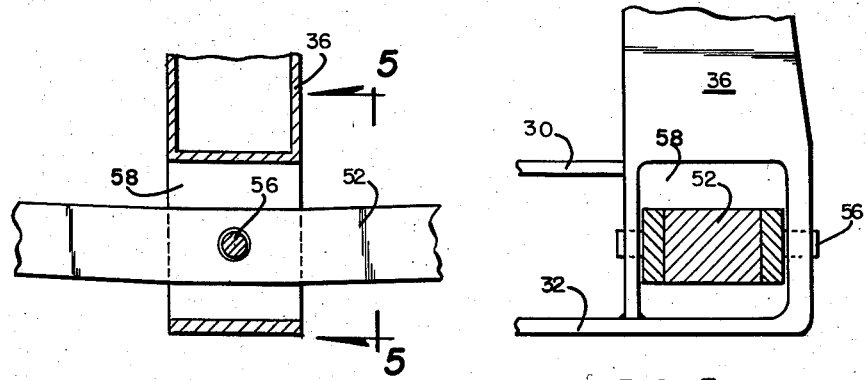
FIG. 4.
FIG. 5.
INVENTORS
JOLLY K. HARRISON
BENJAMIN HARRISON
BY
ATTORNEYS

INVENTORS
JOLLY K. HARRISON
BENJAMIN HARRISON

BY
ATTORNEYS

United States Patent Office
2,922,237
Patented Jan. 26, 1960

2,922,237
APPARATUS FOR CONVERTING A CONVENTIONAL FOUR-WHEEL TRACTOR INTO A TWO-WHEEL TRACTOR AND TWO-WHEEL IMPLEMENT COMBINATION

Benjamin Harrison and Jolly K. Harrison, Columbia, S.C., assignors, by direct and mesne assignments, to The Oliver Corporation, Chicago, Ill., a corporation of Delaware Application August 2, 1956, Serial No. 601,687

4 Claims. (Cl. 37—126)

This invention relates to scrapers of the self propelled type used in road and other grading work, which comprise a tractorlike power unit and a scraper apparatus towed by the power unit. The power unit is supported on one axle and the scraper on another and the two are joined to provide a single machine.

Many of these scrapers and the prime mover or tractor therefor are designed as a single unit and are specially adapted solely for the purpose of scraping. They are extremely costly and the tractors are not suitable for any other purpose. As a result the initial cost of these units has limited their use to larger contractors, and further when there is no use for the equipment the prime mover often stands idle.

Accordingly one of the objects of the instant invention is to provide a tractor-scraper combination embodying a power unit or tractor which can be used for other purposes when the scraper is not needed. In addition the invention has as an object the reduction of the cost of such equipment.

Also another object of the invention is to provide a tractor-scraper unit in which an ordinary tractor can be used as a motor powered means for the scraper unit with minor modifications.

Another object of this invention is to provide a steering system for a tractor-scraper combination which will improve the maneuverability of the same. According to the invention and in realization of one of the objects thereof a hydraulic steering system is provided for steering the tractor unit relative to the scraper. Further in fulfillment of another object of the invention the system is readily adapted to conventional tractors and to scraper pans without considerable modification and at a low cost.

One of the objects of the invention is to provide a steering system embodying hydraulic motor powered means which is wholly mounted on the scraper unit so that when the scraper is detached, the tractor is available for other uses.

Another object of the invention is to provide an hydraulic steering means for tractor-scraper combinations which is of simple construction and in which the steering forces are direct forces (with respect to the steering action desired) and a complicated lever system is unnecessary.

Yet another object of the invention is to provide a simplified method of interconnecting a prime mover such as a tractor and a scraper pan, or similar implement.

One of the main objects of the invention is to provide a means for creating a powered scraper from an ordinary scraping pan and an ordinary tractor which is entirely satisfactory for the intended purpose.

An additional object of the instant invention is to provide a scraper-prime mover combination embodying a conventional tractor which is vastly improved over such combinations heretofore known, with which elaborate connecting means are not needed, and with which single purpose prime movers are not necessary.

Another object of this invention is to provide a steering means useful to move the tractor-scraper out of holes, gullies, etc.

A still further object of the invention is to provide a hitch for connecting a scraper and tractor which ensures increased traction and proper steering.

Further objects of the invention are to provide a tractor-scraper combination which is readily separable, and in which the hitch or connecting means therefor is vertically rigid.

These and other objects and advantages will become apparent from the following description and the accompanying drawings in which:

Figure 3 is an isometric view of the hitch and steering means employed.

Figure 4 is taken along line 4—4 of Figure 3.

Figure 5 is a sectional view taken along line 5—5 of Figure 4.

Similar reference characters for the several views indicate similar parts.

Figure 1:
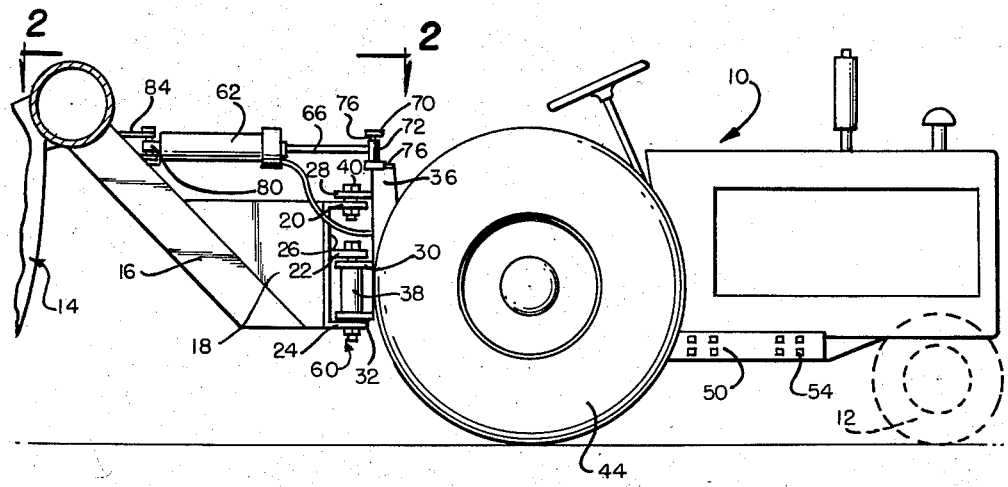
Figure 1 is a side elevational view with some elements broken away showing the hitch and steering means constructed in accordance with the instant invention.

The tractor-scraper combinations to which this invention relates have taken many forms. In many of these elaborate hitch means are often employed for connecting the scraper pan to the tractor or other powered device and, as has been pointed out heretofore, the power device is usually peculiarly adapted to the individual scraper pan only. According to the instant invention, however, the powered device can comprise a simple tractor and the means for interconnecting this tractor and the scraper pan is exceedingly simple as compared to the known devices.

Yet despite the simplicity and despite the use of a common tractor the resulting combination is as effective in operation as equipment selling at a considerably greater cost than units constructed in accordance with the instant invention. Furthermore, due to the simplicity, the maintenance and repair problems are considerably reduced. In addition, due to the versatility of the tractor, the latter can be used for other purposes.

Another unique advantage of the construction disclosed in the instant application is that the tractor can be pushed out of a hole by the hydraulic means mentioned above which is used for steering since the tractor can be "wiggled" to one side or the other as will become apparent hereinafter. Further the transference of load from the scraper pan to the tractor through the simple construction disclosed is entirely satisfactory for the intended purposes and not only facilitates steering the tractor but also increases the traction thereof. In fact actual apparatus constructed in accordance with the instant invention in which 78 horsepower engines have been used have accomplished work equivalent to outfits which run up to 200 horsepower.

An additional feature of the instant invention is that many of the weights which were found to be necessary to obtain satisfactory traction with the heretofore known devices can be removed. Also it is unnecessary to place water in the tires as was necessary with many of the previously known devices to add weight to obtain satisfactory traction.

The novel instant apparatus represents a departure from the accepted type of powered scraper and results in a unit which can be employed in much greater quantities than heretofore possible. Moreover the disclosed hitch means readily adapts the tractor-scraper combination for use on extremely uneven ground since the hitch readily permits relative movement of the units. The above and other advantages and features are embodied in the herein disclosed invention.

Referring now in particular to the drawings: A farm tractor such as tractor 10 which is normally provided with steerable front wheels 12 for towing the usual farm implements and the like is used as the motive means for our tractor-scraper. A pan scraper, such as the scraper 14 shown in the drawings which is adapted to be towed by tractors such as the common variety used for many tasks or with special elaborate framing is adapted to be towed by single purpose prime moving devices specially designed to accommodate the scrapers, forms the other member of our tractor-scraper. According to our invention hitch means is provided for the tractor-scraper combination which permits steering of the tractor without use of the front wheels 12. The front wheels, therefore, are removed.

The scraper 14 is seen to have a depending forwardly extending frame portion 16 which can be formed by two side members and suitable cross connecting plates. Adjacent the forward lower end of the frame portion 16 a box-like supporting structure 18 is secured which has a number of flanges 20, 22, and 24 fastened to the forward wall 26 thereof, three being utilized in this example. The flanges 20, 22 and 24 are arranged to cooperate with flanges 28, 30 and 32 similarly disposed on the rear face 34 of a rocker arm 36. The lower pairs of flanges 22—30 and 24—32 are adapted to receive a main hinge or connecting pin 38, while the upper flanges 20 and 28 are connected in a similar manner by the auxiliary hinge pin 40. The purpose of the auxiliary connection comprising the pin 40 and flanges 20 and 28 is the prevention of too severe application of shearing forces to the main connecting pin 38, as the tractor-scraper combination moves over uneven terrain. The pins may be held in position by nuts, pins, etc. such as pins 42.

The flange-pin connections provide for free horizontal relative rotation of the scraper pan and the tractor. It is understood that suitable bearings may be provided as needed, and in the constructions shown, plain sleeve bearings are used in conjunction with the hinge pins 38 and 40. The resulting connection between the tractor and the scraper produces a vehicle which is vertically rigid and is supported by a pair of tractor wheels 44 and a second pair of wheels secured to the scraper 14. The last-mentioned wheels are at the rear of the scraper. The load of the scraper pan 14 pivots forwardly about these wheels and is supported at the front by the wheels 44 of the tractor.

Figure 2:
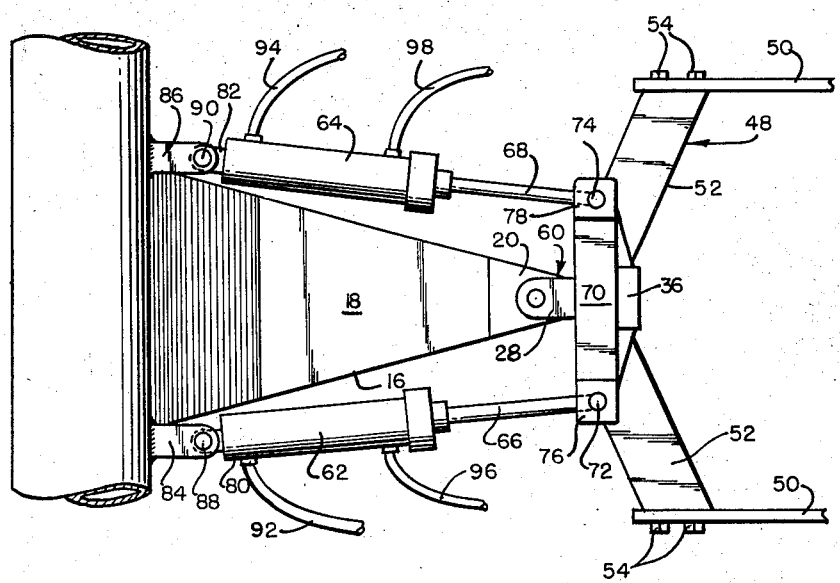
Figure 2 is a fragmentary top plan view along line 2—2 of Figure 1.
Figure 6:
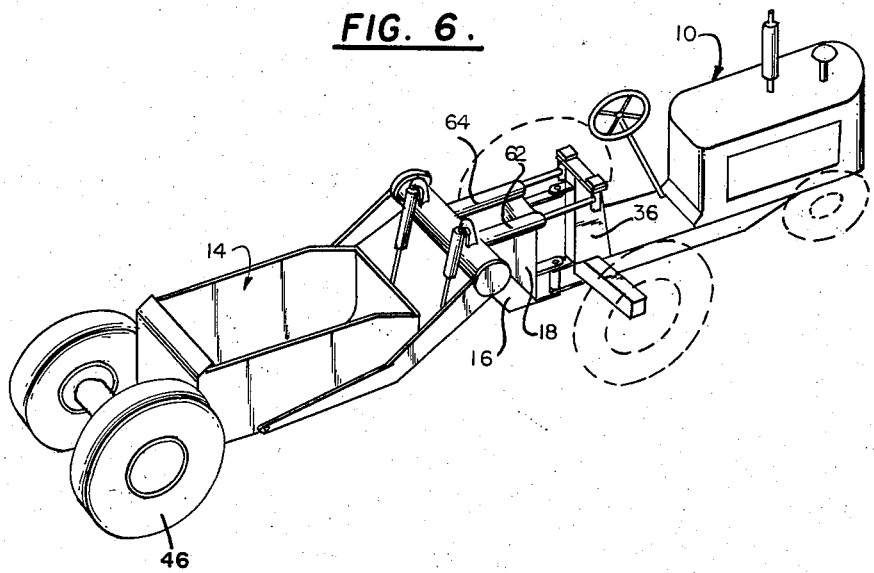
Figure 6 is an isometric view illustrating the scraper-tractor combination.
Figure 7:
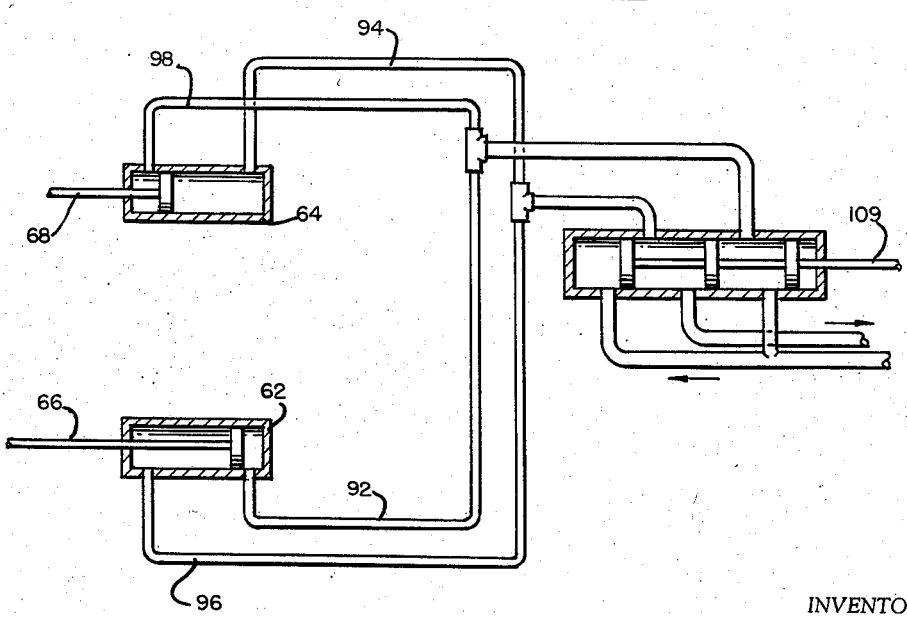
Figure 7 is a schematic view of an hydraulic circuit.

The tractor frame may be stiffened when necessary to accommodate the weight of the attachment of the scraper and, in this example of the invention, the construction includes a drawbar frame, generally indicated by the reference character 48 which constitutes an attachment to the tractor chassis. This frame 48 includes spaced parallel side members 50 attached to the tractor chassis and a bar or draft cross member 52, which is secured thereto by means such as bolts or rivets 54. To facilitate drawing of the scraper 14 or other implement the cross member is bowed rearwardly (Fig. 2). The attachment 48 thus forms a rigid frame forming an extension of the usual tractor draft bar frame.

The aforementioned rocker arm 36 is mounted centrally of the cross member 52, and, as better shown in Figs. 3–5, is pivotally secured thereto by means of a pin 56 so as to be pivotal about a horizontal axis. The cross member 52 extends through an aperture 58 formed in the rocker arm 36 adjacent the bottom thereof. Inasmuch as pin 56 extends longitudinally of the tractor 10 and scraper 14 unit, the rocker arm 36 is enabled to pivot transversely of the unit or, in other words, to move through a vertical arc substantially longitudinally of the cross member 52. With this arrangement, the tractor and scraper are permitted to tilt sidewise of one another as necessitated by uneven ground, obstructions or the like thereby preventing the imposition of excessive strain to the hitch and steering means.

In order to steer the tractor-scraper unit, means are provided for operating hinge 60 of the hitch, which hinge comprises the flanges 20—32 and the pins 38 and 40. Such means are arranged to pivot the hitch, including the hinge 60, to the left or to the right and thereby to provide not only normal steering for the unit but in addition to enable the tractor to be "wiggled" for the purpose of removing the scraper or the tractor from holes, ruts, or other obstacles encountered in the scraping operation. Since each unit of the tractor-scraper combination is mounted only one pair of wheels, steering the combination is effected very efficiently and easily through operation of means presently to be described for manipulating the hinge 60.

One form of steering means includes oppositely operable retractable linkages, for an example the hydraulic motors 62 and 64, connected, respectively, at spaced points on the rocker arm 36 and the forward frame portion 16 of the scraper 14. Thus the hydraulic motors 62 and 64 comprise piston and cylinder arrangements including piston rods 66 and 68 pivotally connected adjacent respective ends of a doubly bifurcate member 70 rigidly affixed atop the rocker arm 36. The forward ends of the piston rods 66 and 68 are pivotally secured to the opposite ends of the member 70 by means of pins 72 and 74 extending respectively through extension bearing pads 76 and 78 secured to the outer ends of the member 70. The rearward apertured ends 80 and 82 of the hydraulic motors 62 and 64 are pivotally connected respectively to oppositely disposed brackets 84 and 86 which, in turn, are rigidly secured to the scraper frame portion 16. The respective pins 88 and 90 form the pivotal connections between these parts.

Hydraulic fluid is admitted to either of the motors 62 or 64 through suitable conduits 92 and 94, 96 and 98 connected thereto. Double acting motors are preferably used, and a control valve (not shown in the drawings) which is of any known suitable type is used to control the action of the motors. Such mechanism is well-known and accordingly further description is not deemed necessary. Therefore, by admitting hydraulic fluid to one end of the motor 62 and the opposite end of motor 64, for example, the piston and associated rod 66 are forced farther into the cylinder of motor 62 and the piston and associated rod 68 are forced farther out of the cylinder of motor 64. This movement of the piston rods 66 and 68 operates upon the member 70 to pivot the rocker arm 36 and the cross member 52 and consequently the tractor 10, to the right (Figs. 2 and 3). By similar operation of the hydraulic motors, movement of the tractor in the opposite direction is effected.

The pivotal movement of the rocker arm or cross member 52 is limited by the size of the opening 58. Preferably the opening is sized to give adequate movement for all conditions.

From the foregoing it will be apparent that a novel mechanism is provided for coupling and steering a tractor-scraper combination. The hitch and steering mechanism obviously can be utilized with other implements of comparable size, which are customarily drawn by tractors, such as agricultural machinery. Therefore, numerous modifications of the aforedescribed exemplary forms of the invention will occur to those skilled in the art without departing from the spirit and scope of the appended claims.

We claim:

1. A tractor-implement unit comprising a two-wheel tractor, a two-wheel implement, a generally U-shaped frame including a pair of side member portions secured to said tractor longitudinally along opposite sides thereof and a cross member portion connected to said side member portions and spaced rearwardly from the axle for the tractor wheels, a rocker arm mounted centrally of said cross member portion for vertically pivotal movement transversely of said tractor, and pivotal connecting means on said rocker arm and on said implement for pivotally connecting said implement to said rocker arm.

2. A tractor-implement unit comprising a two-wheel tractor, a two-wheel implement, a generally U-shaped frame including a pair of side member portions secured to said tractor longitudinally along opposite sides thereof and a cross member portion connected to said side member portions and spaced rearwardly from the axle for the tractor wheels, a rocker arm, means centrally of said cross member portion for pivotally mounting said rocker arm for vertically pivotal movement transversely of said tractor, and pivotal connecting means on said rocker arm and on said implement for pivotally connecting said implement to said rocker arm, said rocker arm and the entire mounting means therefor on said cross member portion being located rearwardly of said axle adjacent the projected periphery of the tires on said tractor wheels.

3. A hitch for connecting a two-wheel implement to a two-wheel tractor comprising a generally U-shaped frame including a pair of side member portions adapted to be secured to a tractor longitudinally along opposite sides thereof and a cross member portion connected to said side member portions and adapted to be spaced rearwardly of the axle for the tractor wheels when the frame is mounted on the tractor, a rocker arm mounted centrally of said cross member portion for vertically pivotal movement transversely of said tractor, and means on said rocker arm for pivotally connecting a two-wheel implement thereto.

4. In a tractor-scraper combination, in combination, a draft frame means connectible to a tractor, said frame means comprising spaced apart longitudinally extending members adapted to be connected to a tractor frame and extending rearwardly therefrom, a transverse draft member extending between the rear ends of said first members, a rocker arm, said rocker arm extending vertically with respect to said draft member, said rocker arm having an opening adapted to receive said draft member, said draft member extending through said opening, pivot means within said opening connecting said draft member to said rocker arm for pivotal movement of said rocker arm about a horizontal axis, means for limiting the pivotal movement of said rocker arm with respect to said second member, said rocker arm having a vertical rear face, spaced pivot support means on said vertical face, said scraper having a downwardly depending forward portion, vertically spaced pivot means on said downwardly depending forward portion cooperating with the first mentioned pivot means, means for pivotally interconnecting said pivot means and means connected to said scraper and to said rocker arm for rotating said scraper with respect to said rocker arm about the last named pivot means.

References Cited in the file of this patent

UNITED STATES PATENTS

| | | |
|---|---|---|
| 2,189,072 | Le Tourneau | Feb. 6, 1940 |
| 2,368,202 | Clark | Jan. 30, 1945 |
| 2,583,197 | Armington | Jan. 22, 1952 |
| 2,614,644 | Gustafson | Oct. 21, 1952 |
| 2,650,440 | Quartullo | Sept. 1, 1953 |
| 2,773,320 | Fryer et al. | Dec. 11, 1956 |